(12) United States Patent
Wang et al.

(10) Patent No.: US 12,505,608 B2
(45) Date of Patent: Dec. 23, 2025

(54) RAY TRACING CHANNEL MODELING METHOD FOR RECONFIGURABLE INTELLIGENT SURFACE WIRELESS COMMUNICATION

(71) Applicant: Southeast University, Jiangsu (CN)

(72) Inventors: Chengxiang Wang, Jiangsu (CN); Jialing Huang, Jiangsu (CN); Mngzhuo Sun, Jiangsu (CN); Jie Huang, Jiangsu (CN); Fuchun Zheng, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 256 days.

(21) Appl. No.: 18/563,997

(22) PCT Filed: Apr. 6, 2023

(86) PCT No.: PCT/CN2023/086738
§ 371 (c)(1),
(2) Date: Nov. 24, 2023

(87) PCT Pub. No.: WO2023/169595
PCT Pub. Date: Sep. 14, 2023

(65) Prior Publication Data
US 2024/0257438 A1 Aug. 1, 2024

(30) Foreign Application Priority Data
Mar. 7, 2022 (CN) .......................... 202210214609.3

(51) Int. Cl.
*G06T 17/20* (2006.01)
*G06T 15/06* (2011.01)

(52) U.S. Cl.
CPC .................................. *G06T 15/06* (2013.01)

(58) Field of Classification Search
CPC ........ G06T 15/06; H04W 4/44; H04W 16/22; H04W 24/10; H04W 8/00; H04B 17/391;
(Continued)

(56) References Cited

U.S. PATENT DOCUMENTS 8,315,212 B2* 11/2012 Karaoguz ............. H04W 40/08
370/329
11,153,763 B2* 10/2021 Jung ....................... G06T 17/05
(Continued)

FOREIGN PATENT DOCUMENTS

| CN | 111740226 A | 10/2020 |
| CN | 112865883 A | 5/2021 |

(Continued)

OTHER PUBLICATIONS

Dou, Kianwu et al., "On the Channel Modeling of Intelligent Controllable Electro-magnetic-surface", Chinese Journal of Radio Science, Jun. 30, 2021, vol. 36, No. 3, pp. 368-376.

*Primary Examiner* — Phuc N Doan
(74) *Attorney, Agent, or Firm* — MUNCY, GEISSLER, OLDS & LOWE, P.C.

(57) ABSTRACT

Disclosed in the present disclosure is a ray tracing channel modeling method for reconfigurable intelligent surface wireless communication. The method comprises: setting an application scene; implementing RIS deployment and adjustment mode; analyzing a received power distribution of a non-line-of-sight scene; analyzing an angle power spectral density; and specifically analyzing the change of a channel capacity with the change of a transmitting power, a RIS unit number and a RIS deployment position. In the present disclosure, a RIS channel deterministic model based on ray tracing can be used for a static ray tracing simulation software, the deployment of any scale of a reconfigurable intelligent surface at any position in a scene is supported, the ray tracing modeling method of the reconfigurable intelli-
(Continued)

gent surface is enriched, and the channel characteristic analysis of the simulation result has guiding significance for the application and deployment of RIS in indoor scenes.

2 Claims, 6 Drawing Sheets

(58) Field of Classification Search
CPC ... H04B 7/04013; H04B 7/04026; H04B 17/12; H04B 7/15528
See application file for complete search history.

(56) References Cited

U.S. PATENT DOCUMENTS

| | | | |
|---|---|---|---|
| 11,395,152 B2* | 7/2022 | Lee | H04B 17/30 |
| 2011/0153294 A1* | 6/2011 | Yoon | H04W 16/22 |
| | | | 703/6 |
| 2021/0044988 A1* | 2/2021 | Park | G01N 21/00 |
| 2023/0246674 A1* | 8/2023 | Åström | H04B 7/04013 |
| | | | 375/262 |

FOREIGN PATENT DOCUMENTS

| | | |
|---|---|---|
| CN | 113610988 A | 11/2021 |
| CN | 114584238 A | 6/2022 |
| WO | WO2021260698 A1 | 12/2021 |

* cited by examiner

RAY TRACING CHANNEL MODELING METHOD FOR RECONFIGURABLE INTELLIGENT SURFACE WIRELESS COMMUNICATION

TECHNICAL FIELD

The present disclosure belongs to the technical field of channel modeling, and especially relates to a ray tracing channel modeling method for reconfigurable intelligent surface wireless communication.

BACKGROUND

The sixth generation mobile communication continues to expand the full spectrum applications. The millimeter wave (mmWave) frequency bands and the terahertz (THz) frequency bands become the research hotspots thanks to their allocatable ultra large bandwidths, while the serious path losses caused by the molecular absorptions greatly limit the propagation distances thereof. The reconfigurable intelligent surface (RIS) becomes a potential solution for combating the issues of the propagation distance of the high-frequency communication thanks to the unique characteristic of regulating the electromagnetic propagation environment.

At present, the researches on RIS mainly focus on the geometric random channel modeling and the channel characteristic evaluation on the RIS channels. Based on the electromagnetic theory, the path losses of the RIS channels are derived and verified in the microwave anechoic chamber measurement experiments (Wireless Communications With Reconfigurable Intelligent Surface: Path Loss Modeling and Experimental Measurement). In addition, a three-dimensional geometric random channel model is established for the RIS channel by the literature recently, whose simulation results confirm that the RIS can divide the channel into two cascaded channels and change the channel characteristics (A 3D Non Stationary Channel Model for 6G Wireless Systems Employing Intelligent Reflecting Surfaces with Practical Phase Shifts). There are relatively few researches on the deterministic modeling based on ray tracing for the RIS channels, and compared with the geometric random channel models, the deterministic models can more accurately describe the multipath effects in specific environments.

At present, the deterministic modeling for the RIS channels mainly focuses on the researches of the received power gains on the RIS in the non-line-of-sight environments. The main method is to add two commands of focusing and guiding into the 3D dynamic ray tracing software based on the maps, such that the beams at the transmitting terminal can be propagated to the specific direction according to the command, to increase the received power in the non-line-of-sight environments. The existing literature realizes the deterministic modeling of the RIS channels based on this method. For example, in the 60 GHz frequency band, the vertical walls in the entire indoor environment are set as a reconfigurable intelligent surface equipped with the functions of focusing and guiding with a size of 1 m×1 m. And all receiving terminals in the non-line-of-sight environments obtain the received power gain of 20.6 dB in average (A New Wireless Communication Paradigm through Software controlled Metasurfaces). The above methods and cases are all limited to the analysis of the received power gain in the non-line-of-sight environments to demonstrate the applying feasibility of the reconfigurable intelligent surface in the indoor environments. Moreover, this method does not satisfy the universal design for the half wavelength size in the RIS units and cannot be applied to most of the existing static ray tracing simulation softwares, and the universality of this method needs to be improved. In addition, this method cannot be applied to the research of the position deployments on the RIS in the indoor environments, and the research of the position deployments is indispensable for the application on the RIS.

In summary, it is extremely necessary to establish the deterministic RIS channel model that accurately follows the universal RIS design schemes, can be used to analyze the RIS position deployments, and is suitable for the ordinary static ray tracing simulation softwares.

SUMMARY

The objectives of the present disclosure are to provide a ray tracing channel modeling method for reconfigurable intelligent surface wireless communication, to solve the technical problems in the existing methods that do not satisfy the design for the universal half wavelength size in the RIS units and cannot be applied to most of the existing static ray tracing simulation softwares, that the universality of the existing method needs to be improved, and that the existing methods are not suitable for the research of the RIS position deployments in the indoor environments.

In order to solve the above-mentioned technical problems, the technical solutions of the present disclosure are specifically as follows.

Provided is a ray tracing channel modeling method for reconfigurable intelligent surface wireless communication. And the method includes following steps.

In Step S1, an environmental layout and materials that are applied in the environment are determined, and a simulation environment is drawn in a ray tracing software.

In Step S2, antenna parameters, a transceiver layout, and signal waveform parameters are determined. And material parameters are determined to complete simulation settings according to a frequency of a signal center.

In Step S3, sizes of units, the number of the units, deployment positions, and a preset control direction of a reconfigurable intelligent surface are determined. The preset control direction is specifically a connecting line direction between a center position of a reconfigurable intelligent surface panel and an antenna at the receiving terminal.

In Step S4, adjustment angles of an azimuth angle and adjustment angles of an elevation angle for each intelligent surface unit are calculated to complete adjustments according to the adjustment direction.

In Step S5, a used algorithm, the highest number of reflections, and types of output results in a ray tracing simulation are determined.

In Step S6, the ray tracing simulation is implemented and channel characteristics are analyzed according to output data.

Further, Step S2 specifically includes following steps.

In Step S201, in an application scene determined in Step S1, an antenna type, an antenna polarization type, an antenna aperture, and antenna standing wave ratio; positions of the transmitting terminal and the receiving terminal, point layouts of the transmitting terminal and the receiving terminal, an antenna type matching the transmitting terminal with the receiving terminal, and a receiving threshold of the receiving terminal; and a signal type, a center frequency, and a signal bandwidth are determined.

In Step S202, a dielectric constant of the materials is determined to complete the simulation setting according to the central frequency of the simulation.

Further, Step 4 specifically includes following steps.

In Step S401, a position of the each intelligent surface unit is represented with a center point of the reconfigurable intelligent surface unit, a coordinate of a reconfigurable intelligent surface unit in the m-th row and the n-th column is denoted as $C_{m,n}(c_x, c_y, c_z)$, a coordinate of the transmitting terminal is denoted as $T_x(t_x, t_y, t_z)$, and a coordinate of the receiving terminal is denoted as $R_x(r_x, r_y, r_z)$, and an angular bisector $\mathcal{L}$ between a connecting line $T_x C_{m,n}$ and a connecting line $C_{m,n} R_x$ is calculated.

In Step S402, a point D is arbitrarily took on a positive half axis of the angular bisector $\mathcal{L}$, a straight line parallel to a Z-axis through the point D is made, and a Y-axis of the point E is enabled to be equal to $c_z$ by taking a point E on the vertical line.

In Step S403, the point D is arbitrarily took along a direction of a positive half axis on the Y-axis through the point $C_{m,n}$, and a point G is arbitrarily took along a negative direction of the Z-axis.

In Step S404, an azimuth angle $\theta_{m,n}$, that is, $\angle EC_{m,n}F$, is calculated, and an elevation angle $\varphi_{m,n}$, that is, $\angle GC_{m,n}D$, is calculated according to a cosine theorem.

In Step S405, the reconfigurable intelligent surface unit in the m-th row and the n-th column is rotated around the Y-axis according to the calculated elevation angle $\varphi_{m,n}$, a rotation angle is 90−$\varphi_{m,n}$ in the case where $\varphi_{m,n}$<90°, and the rotation angle is $\varphi_{m,n}$−90 in the case where $\varphi_{m,n}$>90°.

In Step S406, the reconfigurable intelligent surface unit in the m-th row and the n-th column is rotated around the Z-axis according to the calculated elevation angle $\theta_{m,n}$, a rotation angle is 90−$\varphi_{m,n}$ in the case where $\varphi_{m,n}$<90°, and the rotation angle is $\varphi_{m,n}$−90 in the case where $\varphi_{m,n}$>90°.

Further, Step S5 specifically includes following steps.

In Step S501, a simulation area and a noise power spectral density are set.

In Step S502, the highest number of the reflections in the ray tracing simulation is set without considering transmission and diffraction mechanisms.

In Step S503, a routing interval of the transmitting terminal ray and the maximum number of multipaths received by the receiving terminal are set.

In Step S504, a type of simulation results that is required to be output is set, including multipath information, a horizontal arrival angle, and an elevation arrival angle.

Further, Step S6 specifically includes following steps.

In Step S601, a received power at each receiving terminal is calculated according to the multipath information obtained from the simulation, and the multipath information obtained from the simulation is $h_i = P_i e^{j\psi_i}$, where $P_i$ is a received power in an i-th multipath, $\psi_i$ is a phase in the i-th multipat. Then the received power at the receiving terminal is a sum of the received power in all of the multipaths, and an expression is:

$$P_r = \sum_{i=1}^{N_p} P_i,$$

where $P_r$ is the received power at the receiving terminal, and $N_p$ is a total number of the multipaths.

In Step S602, a channel capacity is analyzed according to the calculated received power, the set noise power spectral density and the signal bandwidth, and a calculation expression of the channel capacity is:

$$SNR(dB) = 10\log_{10}(P_R) - 10\log_{10}(N_{total})$$
$$Capacity = B\log_2(1 + SNR)$$

where SNR is a signal-to-noise ratio, $P_R$ is the received power of the receiving terminal, $N_{total}$ is a total noise, B is the signal bandwidth, and Capacity is the channel capacity.

In Step S603, an angle power spectral density is obtained according to the received power and an arrival angle of each path in the multipath information.

The ray tracing channel modeling method for the reconfigurable intelligent surface wireless communication of the present disclosure has the following advantages.

In the static ray tracing simulation software, the present disclosure adjusts the normal vector direction of each unit on the reconfigurable intelligent surface through the geometric calculations, which implements the control function of the reconfigurable intelligent surface to the electromagnetic environments. The unit size of the reconfigurable intelligent surface is strictly designed according to the theoretical requirements for the half wavelength size, and can deploy an arbitrary number of the RIS units in an arbitrary arrangement at an arbitrary position in the environment, and analyze the impacts of the reconfigurable intelligent surfaces on the received power gains and different deployment positions in non-line-of-sight scenes.

BRIEF DESCRIPTION OF THE DRAWINGS

FIG. 4 (a) illustrates a diagram of a routing result with no layout of a reconfigurable intelligent surface in the present disclosure.

FIG. 4 (b) illustrates a diagram of a routing result with a layout of the reconfigurable intelligent surface in the present disclosure.

DETAILED DESCRIPTION OF THE EMBODIMENTS

In order to better understand the objectives, structures, and functions of the present disclosure, a ray tracing channel modeling method for reconfigurable intelligent surface wireless communication is further described in detail in combination with the accompanying drawings.

Embodiment 1

With reference to FIG. 1 to FIG. 5, this embodiment provides a ray tracing channel modeling method for reconfigurable intelligent surface wireless communication. And the method includes following steps.

In Step 1, an environmental layout and materials that are applied in the environment are determined, and a simulation environment is drawn in a ray tracing software.

Figure 2:
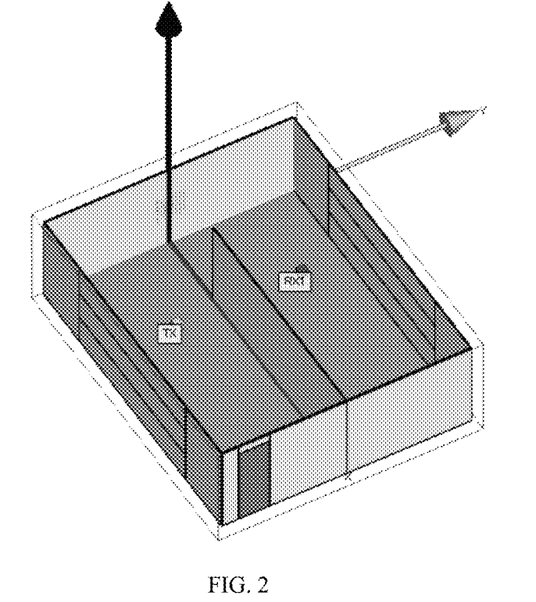
FIG. 2 illustrates a schematic diagram of an indoor scene applying a reconfigurable intelligent surface in Embodiment 1 of the present disclosure.
Figure 3:
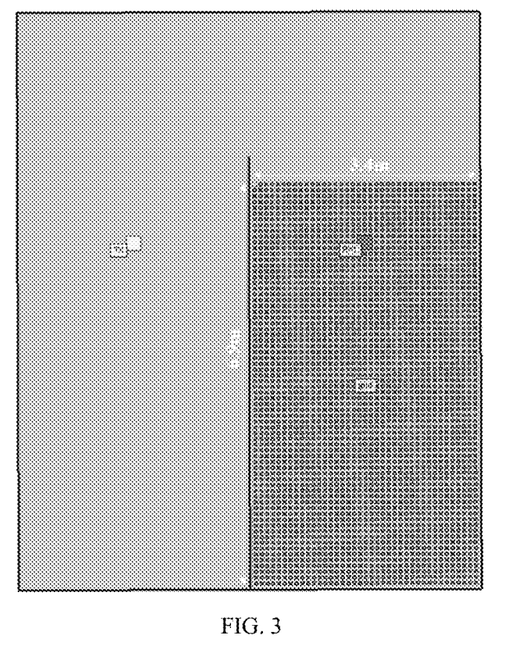
FIG. 3 illustrates a schematic diagram of an antenna layout at a transceiver in Embodiment 1 of the present disclosure.
Figure 4:
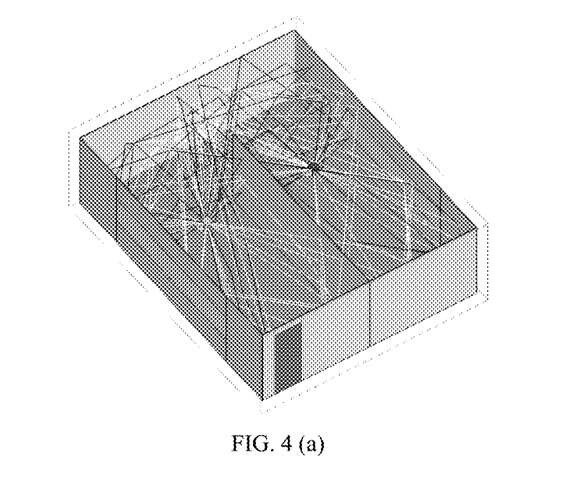

Specifically, in this embodiment, the model adopts a deterministic channel modeling method based on the ray tracing. Firstly, the application scene is determined to be indoor, with a specific room size of 10 m×8 m×3 m. A wall with a length of 8 m is arranged in the center of the room to create a non-line-of-sight environment. The center at the bottom end of the wall which is arranged with the reconfigurable intelligent surface in the room is took as the origin point in the entire scene. The glass windows with the length of 6 m are arranged on two sides of the wall, and a door with the width of 1 m and the height of 2.7 m is arranged on the lower end of the wall. And it is determined that the material of the wall is a three-layer composite dry wall, the material of the windows is glass, the material of the door is wood, and the material of the ground is cement. The simulation environment drawings can be completed in the ray tracing simulation software according to the above settings.

In Step 2, the basic parameters such as antenna, transceiver layout, and signal waveform are determined to complete the simulation settings.

Specifically, the transmitting terminal and the receiving terminal are placed on two sides of the barrier wall respectively. And a horizontal antenna array with a size of 70×39 is further arranged at the side of the receiving terminal, which is used for analyzing the distributions of the received power in this area. All antennas are kept at a height of 1.5 meters, and the specific layout refers to FIG. 3. For simplicity, the horizontal antenna array is set to be invisible in the subsequent display of the simulation results.

More specifically, in this embodiment, the settings for the basic parameters such as the antenna, the transceiver layout, and the signal waveform include the following steps.

In Step S201, the antenna type, positions of the transmitting terminal and the receiving terminal, point layouts of the transmitting terminal and the receiving terminal, an antenna type matching the transmitting terminal with the receiving terminal, and a receiving threshold of the receiving terminal; and a signal type, a center frequency, and a signal bandwidth are determined according to the determined application scene.

Figure 1:
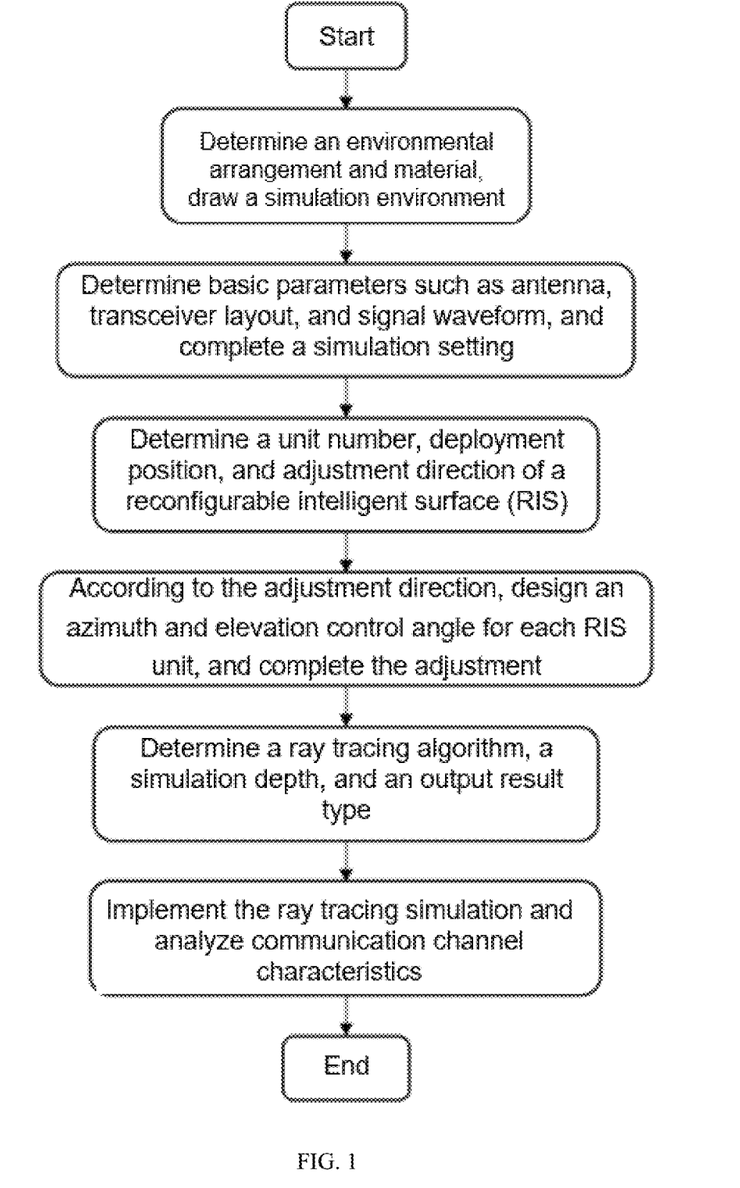
FIG. 1 illustrates a flow chart of a ray tracing channel modeling method for reconfigurable intelligent surface wireless communication provided in Embodiment 1 of the present disclosure.

In this embodiment, as illustrated in FIG. 1, two single points, the transmitting terminal TX and the receiving terminal RX1, are set on two sides of the barrier wall respectively. The coordinate of the transmitting terminal is (4, −2, 1.5), and the coordinate of the receiving terminal is (4, 2, 1.5). An horizontal antenna array with a size of 70×39 is additionally arranged at one side of the receiving terminal, which is used for analyzing the distribution of the received power in this area. And all antennas are maintained at a height of 1.5 m, the vertical polarized omnidirectional antennas are adopted by all the antennas. The threshold of the receiving terminal is set to be −250 dBm. A sine wave with a center frequency of 5.4 GHz and a bandwidth of 320 MHz is adopted in this embodiment.

In Step S202, a dielectric constant of the materials are determined to complete the simulation setting according to the central frequency of the simulation.

The dielectric constant of the materials such as glass, wood, and cement adopted in the environment are corrected according to the center frequency of 5.4 GHz, to complete the settings.

In Step 3, sizes of units, the number of the units, deployment positions, and a preset control direction of the RIS are determined. The control direction is specifically a connecting line direction between a center position of the RIS panel and an antenna at the receiving terminal.

In this embodiment, a reconfigurable intelligent surface equipped with the number of 144 RIS units with a size of 12×12 is adopted, whose unit size is set to be half wavelength according to the simulated center frequency of 5.4 GHz. The reconfigurable intelligent surface is deployed on a wall visible to both the receiving terminal and the transmitting terminal. In order to maintain the center of the intelligent surface at the same height as the receiving terminal and the transmitting terminal, the position of the center of the reconfigurable intelligent surface is set at (0, 0, 1.5). The connecting line direction between the center point of the intelligent surface and the Rx1 is took as the preset control direction, with reference to a positive half axis of the X-axis, the azimuth arrival angle of this control direction is −153°, and the elevation arrival angle of this control direction is 900.

In Step 4, adjustment angles of an azimuth angle and adjustment angles of an elevation angle in each RIS (reconfigurable intelligent surface) unit are calculated to complete adjustments according to the adjustment direction.

Specifically, the step of calculating the adjustment angles of the azimuth angle and the adjustment angles of the elevation angle of each RIS unit to complete adjustments includes the following steps.

In Step S401, a center point of RIS unit is represented as a position of the each reconfigurable intelligent surface unit, a coordinate of a reconfigurable intelligent surface unit in the m-th row and the n-th column is denoted as $C_{m,n}(c_x, c_y, c_z)$, a coordinate of the transmitting terminal is denoted as $T_x(t_x, t_y, t_z)$, and a coordinate of the receiving terminal is denoted as $R_x(r_x, r_y, r_z)$, and an angular bisector $\mathcal{L}$ between a connecting line $T_xC_{m,n}$ and a connecting line $C_{m,n}R_x$ is calculated.

In Step S402, a point D is arbitrarily took on a positive half axis of the angular bisector $\mathcal{L}$ a straight line parallel to a Z-axis through the point D is made, and a point E on this vertical line is took to make a Y-axis of the point E to be equal to $c_z$.

In Step S403, the point D is arbitrarily took along a direction of a positive half axis on the Y-axis through the point $C_{m,n}$, and a point G is arbitrarily took along a negative direction of the Z-axis.

In Step S404, an azimuth angle $\theta_{m,n}$, that is, $\angle EC_{m,n}F$, is calculated, and an elevation angle $\varphi_{m,n}$, that is, $\angle GC_{m,n}D$, is calculated, according to a cosine theorem.

In Step S405, the RIS unit in the m-th row and the n-th column is rotated according to the calculated elevation angle $\varphi_{m,n}$ around the Y-axis, a rotation angle is $90-\varphi_{m,n}$ in the case where $\varphi_{m,n}<90°$, and the rotation angle is $\varphi_{m,n}-90$ in the case where $\varphi_{m,n}>90°$.

In Step S406, the RIS unit in the m-th row and the n-th column is rotated according to the calculated elevation angle $\theta_{m,n}$ around the Z-axis, a rotation angle is $90-\varphi_{m,n}$ in the case where $\varphi_{m,n}<90°$, and the rotation angle is $\varphi_{m,n}-90$ in the case where $\varphi_{m,n}>90°$.

In Step 5, a used algorithm, the highest number of reflections, and the types of output results in a ray tracing simulation are determined.

Specifically, the step of determining a used algorithm, the highest number of reflections, and the types of output results in a ray tracing simulation includes the following steps.

In Step S501, the ray tracing algorithm is set to adopt the X3D algorithm built-in in the Wireless Insite simulation software, with the simulation area covering the entire indoor scene, and the noise power spectral density is set to be −174 dBm.

In Step S502, the highest number of the reflections in the ray tracing simulation is set to be six without considering transmission and diffraction mechanisms.

In Step S503, a routing interval of the transmitting terminal ray is set to be 0.25 and the maximum number of multipaths that can be received by the receiving terminal is set to be 250.

In Step S504, a type of simulation results that is required to be output is set, including multipath information, a horizontal arrival angle, and an elevation arrival angle.

In Step 6, the ray tracing simulation is implemented and channel characteristics are analyzed according to output data.

Specifically, the channel characteristic analysis includes the following steps.

Figure 5:
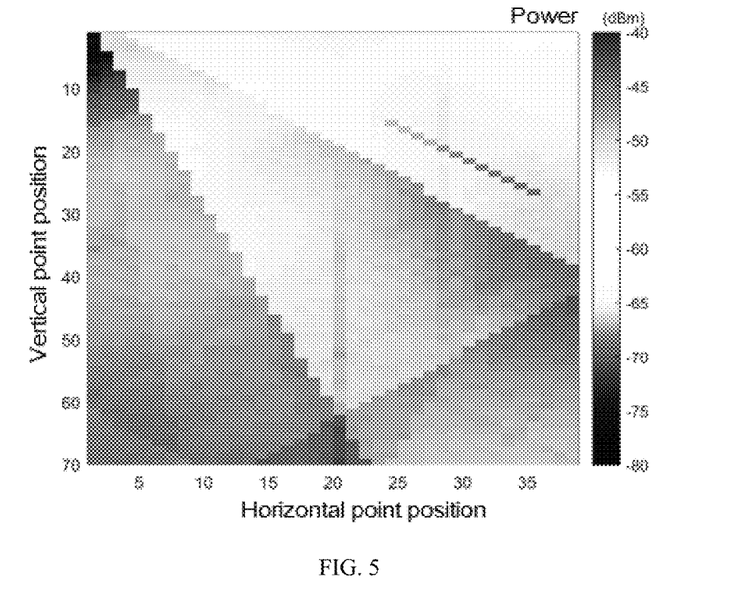
FIG. 5 illustrates a diagram of received power distributions with no layout of the reconfigurable intelligent surface provided in Embodiment 1 of the present disclosure.
Figure 6:
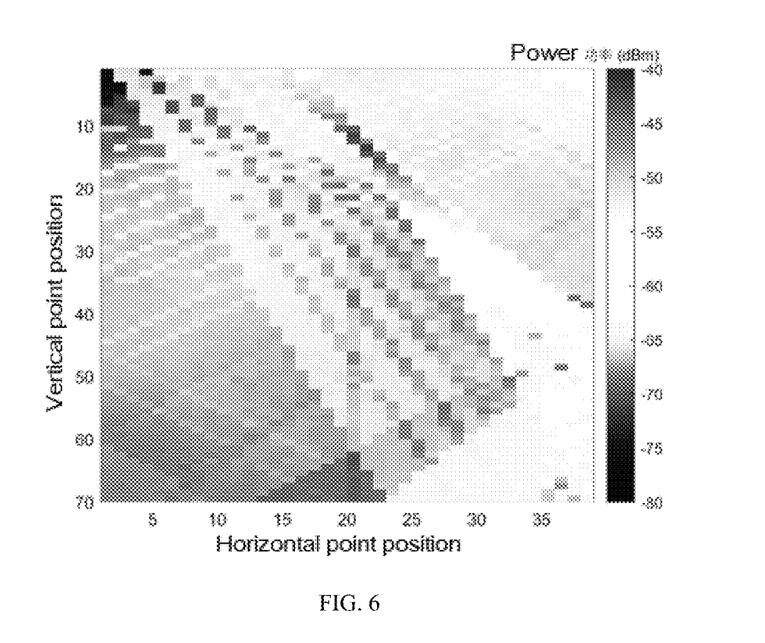
FIG. 6 illustrates a diagram of the received power distributions in the case where the reconfigurable intelligent surface is deployed at a center of a wall provided in Embodiment 1 of the present disclosure.

In Step S601, a received power at each receiving terminal is calculated according to the multipath information obtained from the simulation, and the multipath expression is $h_i = P_i e^{j\psi_i}$, where $P_i$ is a received power in the i-th multipath, $\psi_i$ is a phase in the i-th multipath. Then the received power at the receiving terminal is a sum of the received power in all of the multipaths, and an expression is:

$$P_r = \sum_{i=1}^{N_p} P_i,$$

where $P_r$ is the received power at the receiving terminal, and $N_p$ is a total number of the multipaths. By overlaying the power of each multipath at each receiving point in the horizontal array, the received power at that point is obtained. A diagram of the received power distributions with no layout of a reconfigurable intelligent surface provided is as illustrated in FIG. 5, and a diagram of the received power distributions in the case where the reconfigurable intelligent surface is deployed at a center of a wall is as illustrated in FIG. 6.

Figure 7:
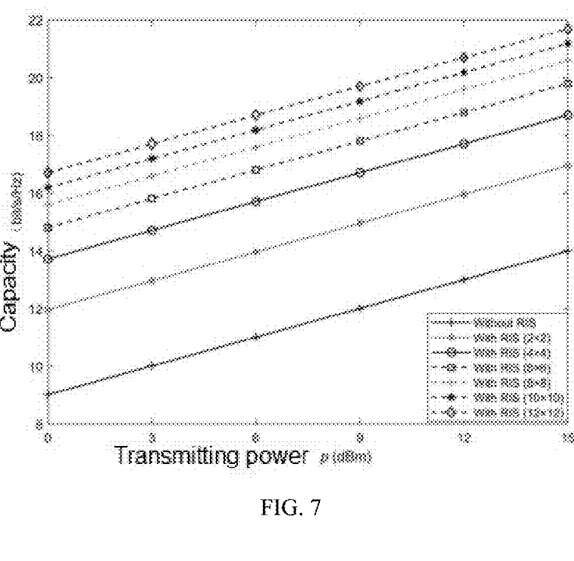
FIG. 7 illustrates a diagram of a capacity analysis on a channel capacity changing along with a transmitting power and the number of RIS units provided in Embodiment 1 of the present disclosure.

In Step S602, a channel capacity is analyzed according to the calculated received power, the set noise power spectral density and the signal bandwidth, and a calculation expression of the channel capacity is:

$$SNR(\text{dB}) = 10\log_{10}(P_R) - 10\log_{10}(N_{total})$$
$$\text{Capacity} = B\log_2(1 + SNR)$$

where SNR is a signal-to-noise ratio, $P_R$ is the received power at the receiving terminal, $N_{total}$ is a total noise, B is the signal bandwidth, and Capacity is the channel capacity. Since the noise power spectral density and signal bandwidth are fixed in the simulation settings, the transmitting power can be used instead of the signal-to-noise ratio. By changing the transmitting power at the transmitting terminal and the number of the units on the intelligent surface, the impacts of the signal-to-noise ratio and the number of the units of the intelligent surface on the channel capacity can be compared with each other. And the simulation results can be referred to FIG. 7. The impacts of the position deployments of the reconfigurable intelligent surfaces on channel capacity can be analyzed by deploying the reconfigurable intelligent surfaces at different positions on the wall. And the comparison results can be referred to Table 1.

TABLE 1

| RIS position deployments | A middle part of transceiver | A side of transmitting terminal | A side of receiving terminal |
|---|---|---|---|
| Received power (dBm) | −51.9836 | −41.7814 | −41.7748 |
| Channel capacity (bit/s/Hz) | 13.2796 | 16.6686 | 16.6708 |

Figure 8:
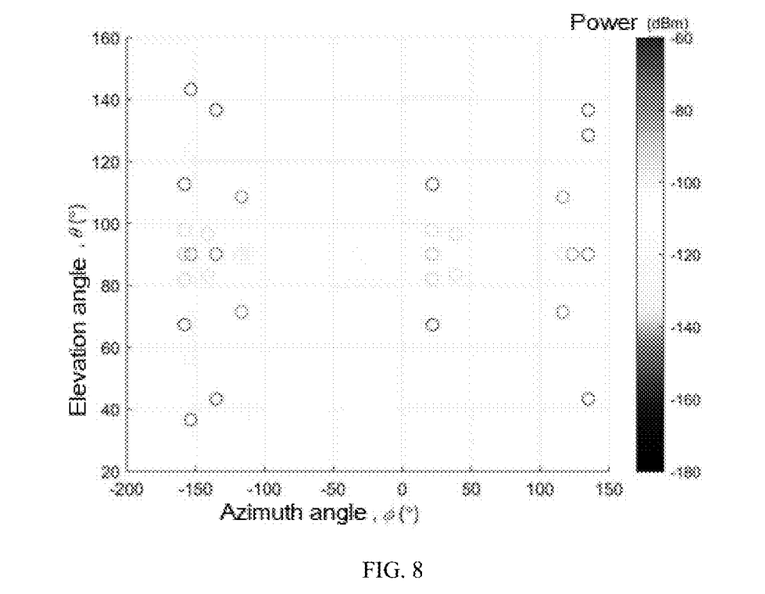
FIG. 8 illustrates a diagram of an angle power spectral density at a point Rx1 with no layout of the reconfigurable intelligent surface provided in Embodiment 1 of the present disclosure.
Figure 9:
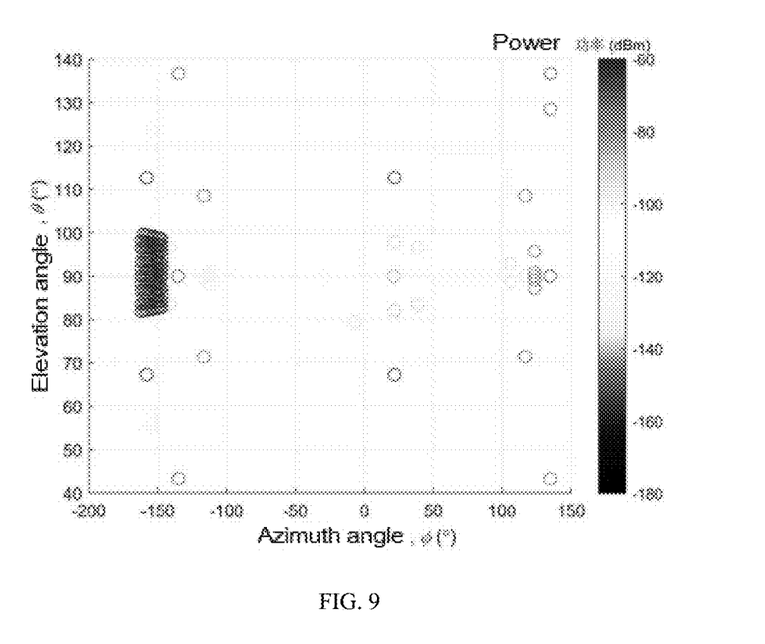
FIG. 9 illustrates a diagram of an angle power spectral density at a point Rx1 in the case where the reconfigurable intelligent surface is deployed in the center of the wall provided in Embodiment 1 of the present disclosure.

In Step S603, an angle power spectral density is obtained according to the received power and an arrival angle of each path in the multipath information. An angle power spectral density at a point Rx1 with no layout of the reconfigurable intelligent surface units can be referred to FIG. 8, and an angle power spectral density at a point Rx1 in the case where the reconfigurable intelligent surface is deployed at a center of a wall can be referred to FIG. 9.

In summary, a RIS channel deterministic model based on ray tracing established by the present disclosure can be used for a static ray tracing simulation software. The deployment of an arbitrary scale of the reconfigurable intelligent surface at an arbitrary position in a scene is supported, which enriches the deterministic modeling method of the intelligent surface. And the channel characteristic analysis of the simulation results has guiding significance for the applications and deployments on the RIS in the indoor scenes.

It can be understood that the present disclosure is described through a plurality of embodiments, and a person skilled in the art is known that various changes or equivalent replacements can be made to these features and embodiments without departing from the spirit and the scope of the present disclosure. In addition, under the guidance of the present disclosure, these features and the embodiments can be modified to adapt to specific situations and materials without departing from the spirit and the scope of the present disclosure. Therefore, the present disclosure is not limited by the specific embodiments disclosed herein, and all the embodiments falling within the scope of claims of the present disclosure are all within the protection scope of the present disclosure.

What is claimed is:

1. A ray tracing channel modeling method for reconfigurable intelligent surface wireless communication, wherein the method comprises following steps:
   Step S1, determining an environmental layout and materials that are applied in the environment, and drawing a simulation environment in a ray tracing software;
   Step S2, determining antenna parameters, a transceiver layout, and signal waveform parameters, and determining, according to a frequency of a signal center, material parameters, to complete simulation settings;
   Step S3, determining sizes of units, a number of the units, deployment positions, and a preset control direction of a reconfigurable intelligent surface, wherein the preset control direction is specifically a connecting line direction between a center position of a reconfigurable intelligent surface panel and an antenna at the receiving terminal;
   Step S4, calculating, according to the adjustment direction, adjustment angles of an azimuth angle and adjustment angles of an elevation angle for each reconfigurable intelligent surface unit, to complete adjustments;

Step S5, determining a used algorithm, a highest number of reflections, and types of output results in a ray tracing simulation;

Step S6, implementing the ray tracing simulation, and analyzing, according to output data, channel characteristics;

wherein Step 4 specifically includes following steps:

Step S401, representing a position of the each reconfigurable intelligent surface unit with a center point of the reconfigurable intelligent surface unit, denoting a coordinate of a reconfigurable intelligent surface unit in an m-th row and a n-th column as $C_{m,n}(c_x, c_y, c_z)$, a coordinate of the transmitting terminal as $T_x(t_x, t_y, t_z)$, and a coordinate of the receiving terminal as $R_x(r_x, r_y, r_z)$, and calculating an angular bisector $\mathcal{L}$ between a connecting line $T_x C_{m,n}$ and a connecting line $C_{m,n} R_x$;

Step S402, arbitrarily taking a point D on a positive half axis of the angular bisector $\mathcal{L}$, making a straight line parallel to a Z-axis through the point D, and enabling, by taking a point E on the vertical line, a Y-axis of the point E equal to $c_z$;

Step S403, arbitrarily taking, along a direction of a positive half axis on the Y-axis through the point $C_{m,n}$, the point D, and arbitrarily taking, along a negative direction of the Z-axis, a point G;

Step S404, calculating, according to a cosine theorem, an azimuth angle $\theta_{m,n}$, that is, $\angle EC_{m,n}F$, and an elevation angle $\varphi_{m,n}$, that is, $\angle GC_{m,n}D$;

Step S405, rotating, according to the calculated elevation angle $\varphi_{m,n}$, the reconfigurable intelligent surface unit in the m-th row and the n-th column around the Y-axis, wherein a rotation angle is $90-\varphi_{m,n}$ in a case where $\varphi_{m,n}<90°$, and the rotation angle is $\varphi_{m,n}-90$ in a case where $\varphi_{m,n}>90°$, and Step S406, rotating, according to the calculated elevation angle $\varphi_{m,n}$, the reconfigurable intelligent surface unit in the m-th row and the n-th column around the Z-axis, wherein a rotation angle is $90-\varphi_{m,n}$ in a case where $\varphi_{m,n}<90°$, and the rotation angle is $\varphi_{m,n}-90$ in a case where $\varphi_{m,n}>90°$;

wherein Step S5 specifically includes following steps:

Step S501, setting a simulation area and a noise power spectral density;

Step S502, setting the highest number of the reflections in the ray tracing simulation, without considering transmission and diffraction mechanisms;

Step S503, setting a routing interval of the transmitting terminal ray and a maximum number of multipaths received by the receiving terminal; and Step S504, setting a type of simulation results that is required to be output, including multipath information, a horizontal arrival angle, and an elevation arrival angle;

wherein Step S6 specifically includes following steps:

Step S601, calculating, according to the multipath information obtained from the simulation, a received power at each receiving terminal, wherein the multipath information obtained from the simulation is $h_i = P_i e^{j\psi_i}$, where $P_i$ is a received power in an i-th multipath, $\psi_i$ is a phase in the i-th multipath, then the received power at the receiving terminal is a sum of the received power in all of the multipaths, and an expression is:

$$P_r = \sum_{i=1}^{N_p} P_i,$$

where $P_r$ is the received power at the receiving terminal, and $N_p$ is a total number of the multipaths;

Step S602, analyzing, according to the calculated received power, the set noise power spectral density and the signal bandwidth, a channel capacity, wherein a calculation expression of the channel capacity is:

$$SNR(\text{dB}) = 10\log_{10}(P_R) - 10\log_{10}(N_{total})$$
$$\text{Capacity} = B\log_2(1 + SNR),$$

where SNR is a signal-to-noise ratio, $P_R$ is the received power of the receiving terminal, $N_{total}$ is a total noise, B is the signal bandwidth, and Capacity is the channel capacity; and Step S603, obtaining, according to the received power and an arrival angle of each path in the multipath information, an angle power spectral density.

2. The ray tracing channel modeling method for the reconfigurable intelligent surface wireless communication, according to claim 1, wherein Step S2 specifically includes following steps:

Step S201, in an application scene determined in Step S1, determining an antenna type, an antenna polarization type, an antenna aperture, and antenna standing wave ratio; positions of the transmitting terminal and the receiving terminal, point layouts of the transmitting terminal and the receiving terminal, an antenna type matching the transmitting terminal with the receiving terminal, and a receiving threshold of the receiving terminal; and a signal type, a center frequency, and a signal bandwidth; and Step S202, determining, according to the central frequency of the simulation, a dielectric constant of the materials, to complete the simulation settings.

* * * * *